GUN LOADING MECHANISM

Filed July 13, 1960 11 Sheets-Sheet 1

Inventors
Franz Horn, Hans Klapdohr,
Otto Peus, & Heinrich Binder
By:
Watson, Cole, Grindle & Watson
Attorneys Inventors
FRANZ HORN, HANS KLAPDOHR,
OTTO PEUS, & HEINRICH BINDER
BY: Watson, Cole, Grindle & Watson
ATTORNEYS Oct. 15, 1963 H. KLAPDOHR ETAL 3,106,866

GUN LOADING MECHANISM

Filed July 13, 1960 11 Sheets-Sheet 3

Inventors
Franz Horn, Hans Klapdohr,
Otto Peus, & Heinrich Binder
By: Watson, Cole, Grindle Watson
Attorney Oct. 15, 1963 H. KLAPDOHR ET AL 3,106,866

GUN LOADING MECHANISM

Filed July 13, 1960 11 Sheets-Sheet 4

Inventors
Franz Horn, Hans Klapdohr,
Otto Peus, & Heinrich Binder
By:
Watson, Cole, Grindle & Watson
Attorneys Oct. 15, 1963 H. KLAPDOHR ETAL 3,106,866

GUN LOADING MECHANISM

Filed July 13, 1960 11 Sheets-Sheet 5

Inventors
Frans Horn, Hans Klapdohr,
Otto Peus, and Heinrich Binder
By:
Watson, Cole, Grindle & Watson
Attorneys Oct. 15, 1963 H. KLAPDOHR ETAL 3,106,866

GUN LOADING MECHANISM

Filed July 13, 1960 11 Sheets-Sheet 6

Inventors
FRANZ HORN, HANS KLAPDOHR,
OTTO DEUS, & HEINRICH BINDER
BY: Watson, Cole, Grindle & Watson
ATTORNEYS Oct. 15, 1963 H. KLAPDOHR ETAL 3,106,866

GUN LOADING MECHANISM

Filed July 13, 1960 11 Sheets-Sheet 7

Inventors
Franz Horn, Hans Klapdohr, Otto Paus, & Heinrich Binder
By: Watson, Cole, Grindle & Watson
Attorneys Oct. 15, 1963 H. KLAPDOHR ETAL 3,106,866

GUN LOADING MECHANISM

Filed July 13, 1960 11 Sheets-Sheet 8

Inventors
Franz Horn, Hans Klapdohr,
Otto Peus, & Heinrich Binder
By: Watson, Cole, Grindle & Watson
Attorneys Oct. 15, 1963 H. KLAPDOHR ETAL 3,106,866

GUN LOADING MECHANISM

Filed July 13, 1960 11 Sheets-Sheet 9

Inventors
Franz Horn, Hans Klapdohr,
Otto Peus + Heinrich Binder
By: Watson, Cole, Grindle + Watson
Attorneys Inventors
Franz Horn, Hans Klapdohr,
Otto Peus, + Heinrich Binder
By: Watson, Cole, Grindle & Watson
Attorneys

GUN LOADING MECHANISM

Filed July 13, 1960 11 Sheets-Sheet 11

Inventors
Franz Horn, Hans Klapdohr,
Otto Peus, & Heinrich Binder
By: Watson, Cole, Grindle & Watson
Attorneys United States Patent Office 3,106,866

Patented Oct. 15, 1963

3,106,866

GUN LOADING MECHANISM

Hans Klapdohr, Erkrath, near Dusseldorf, Heinrich Binder, Neuss, and Franz Horn and Otto Peus, Dusseldorf, Germany, assignors to Firma Rheinmetall G.m.b.H., Dusseldorf, Germany Filed July 13, 1960, Ser. No. 42,604
Claims priority, application Germany July 15, 1959
11 Claims. (Cl. 89—45)

Figure 1:
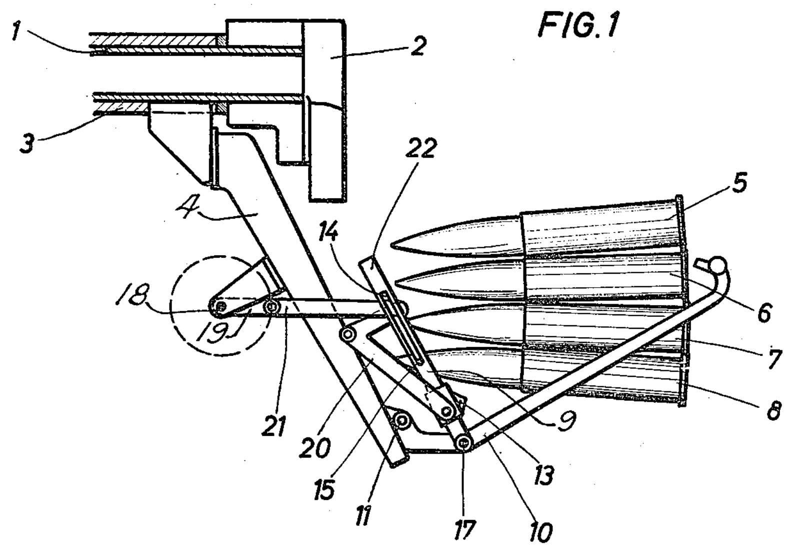

The present invention relates to a gun loading mechanism, for example, for use in armoured gun mounts or gun turrets with recoiling gun barrels and shell racks located behind the barrel.

In known loading mechanisms the gun is loaded by first raising the shell or projectile by means of a lifting arm travelling along an arc of a circle or by an ammunition lift to a position behind the barrel until it is level and co-axial with the centre line of the gun barrel; after which it is moved longitudinally, i.e. inserted into the gun barrel, by hand or sometimes by means of a loading device working independently of the lifting mechanism.

However, this discontinuous method of inserting the shells into the gun barrel is comparatively a very slow process, since between the two stages of its transport, i.e. before it is inserted into the barrel, the shell must first be brought to rest, i.e. its movement must be retarded, and then accelerated again. Thus the rate of fire which can be achieved with such loading mechanisms is not always adequate. Another disadvantage of these loading mechanisms is the fact that to place the shells on the loading platform of a loading arm or the like, lifting devices are required, or an additional operator is required to push the shell into the barrel by hand. But mainly such loading mechanisms are comparatively very bulky. They are therefore not suitable for smaller gun turrets or light armoured vehicles.

In the case of another known loading mechanism for armoured vehicles with a horizontal shell rack positioned behind the gun barrel, the shells are taken from the shell rack by means of a loading arm rotating in a circle, brought to a co-axial position with the centre line of the barrel and then inserted into the barrel by means of a separate hydraulically operated transport device. It is true that with this device, the operator is not required who otherwise loads the gun, but the hydraulic loading mechanism together with its control appliances and the separately actuated loading arm moving in a circular path require a complicated and bulky structure. Moreover, the rate of fire is not altogether satisfactory, since here again the loading operation requires a number of successive movements.

It is an object of the present invention to provide a loading mechanism incorporating a shell rack, for example for use in small armoured vehicles which combines simple construction and compactness with a rapid loading action, thereby ensuring a high rate of fire.

To solve this problem according to the invention, the shell rack located in the neighbourhood of the gun cradle is positioned below the centre line of the gun barrel and is provided with at least two loading arms which can be extended or rotated respectively in the vertical plane of the barrel; one of the loading arms seizes the front end of the shell, which is located at the open end of the shell rack, from underneath and raises it to the level of the loading aperture of the barrel, while the other loading arm, which travels along an arc of a circle, supports the rear end of the shell and at the same time raises the rear end of the shell and pushes it into the barrel.

It is an important advantage of this type of loading mechanism that the transfer of the shell from the shell rack to the gun barrel can now take place in one continuous movement, and without interruption of the separate stages of the movement. For while the shell is still being raised up by one of the lifting arms in front, the other lifting arms has already started to operate such that at the same time the shell is being moved longitudinally in the direction of the loading aperture of the barrel. These movements of the two lifting members are with advantage so linked or superimposed that when the shell reaches the level of the loading aperture of the barrel, the front end of the shell is in the immediate vicinity of the loading end of the gun barrel. During this operation, the shell is raised up in an oblique path to the level of the loading aperture of the barrel; at the same time the rear end of the shell is raised up and the latter is fully pushed home into the breech. Since there is a smooth transition from the lifting to the insertion movement, and since the shell does not undergo a sudden change of direction with the attendant interruption of its travel, a very short period only is required for the loading operation. Thus it is possible to achieve a high rate of fire with the loading mechanism of the invention.

In addition, the combination of a shell rack attached to the gun cradle with lifting arms located by the sides of the gun results in a particularly simple and compact construction of the loading mechanism. Since the loading mechanism is located in the vertical plane of the barrel underneath the latter, the space on either side of the gun is essentially unoccupied, so that there is adequate space, even in small armoured vehicles, for the accommodation of personnel on the right and left hand sides of the gun.

Moreover, with the aid of the loading mechanism according to the invention the loading operation may be made fully automatic, so that it is not necessary to provide an additional man to insert or push in the shell.

The loading arm lifting up the shells is with advantage designed as a telescopic tube, and the loading arm pushing the shells in is designed as a lever pivoting about a fulcrum located on an extension of the gun cradle and travelling along an arc of a circle. Both these lifting arms may, in such an arrangement, be actuated by a common drive. It is possible to use a sliding block, which travels along the outer tube and exerts an effort on a cross pin mounted on the extensible inner tube, to extend and retract the telescopic tube. If the lower end of the telescopic tube is hinged to the lifting lever pushing the shell into the gun at a small distance from the fulcrum such that it can rotate, the said sliding block of the telescopic tube can at the same time cause the rotation of the said lifting lever pushing the shell into the gun after the fully extended position of the telescopic tube has been reached. In accordance with a further development of the invention, a crank is provided for the actuation of the two loading arms; the movement of this crank being transmitted through a connecting link and a double-ended lever pinned to the extension of the gun cradle to the above mentioned sliding block. This not only results in an exceptionally simple method of actuating the two lifting devices, but it is also possible to rotate the telescopic tube at the same time to and fro in the vertical plane relative to the barrel as in a crank slot by actuating the double-ended lever. At the commencement of the loading operation, this rotary motion makes it possible to seize the shells located near the open end of the shell rack from underneath.

Figure 3:
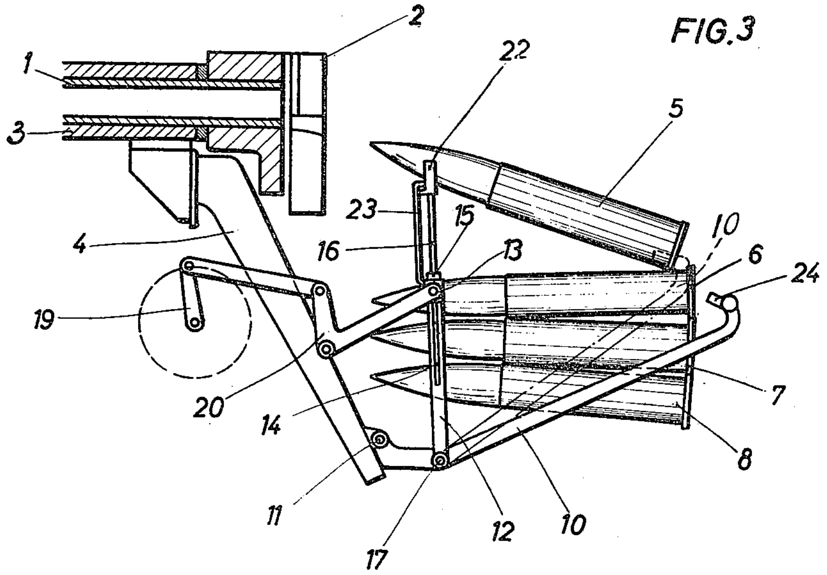
Figure 6:
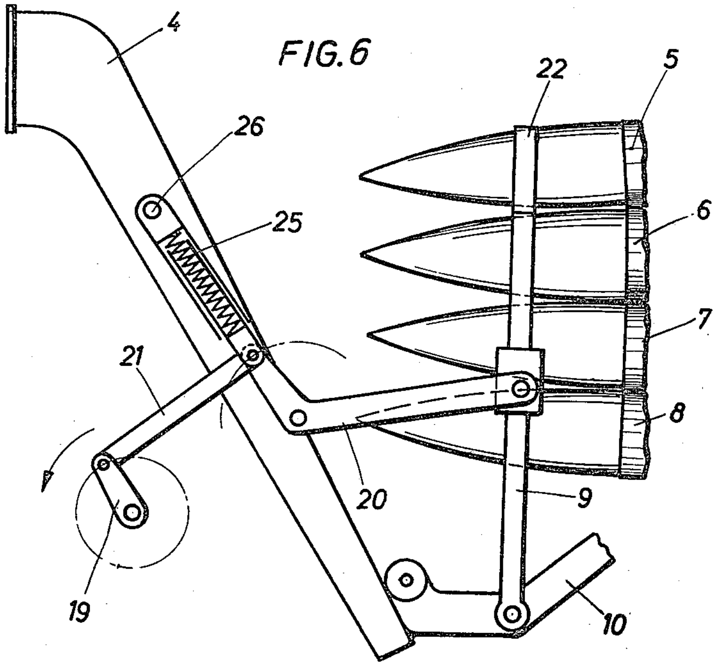
Figure 4:
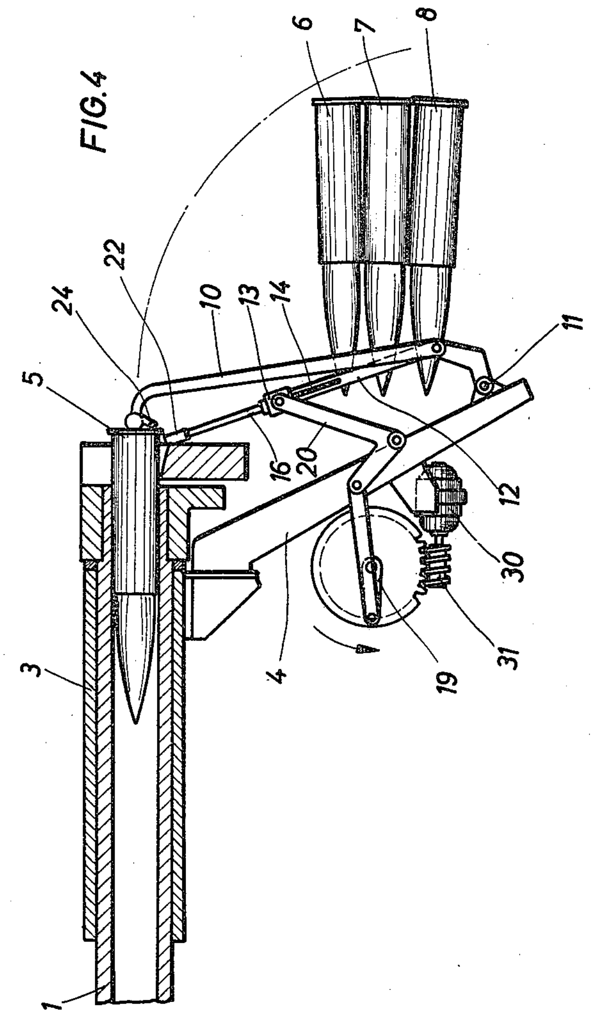
Figure 5:
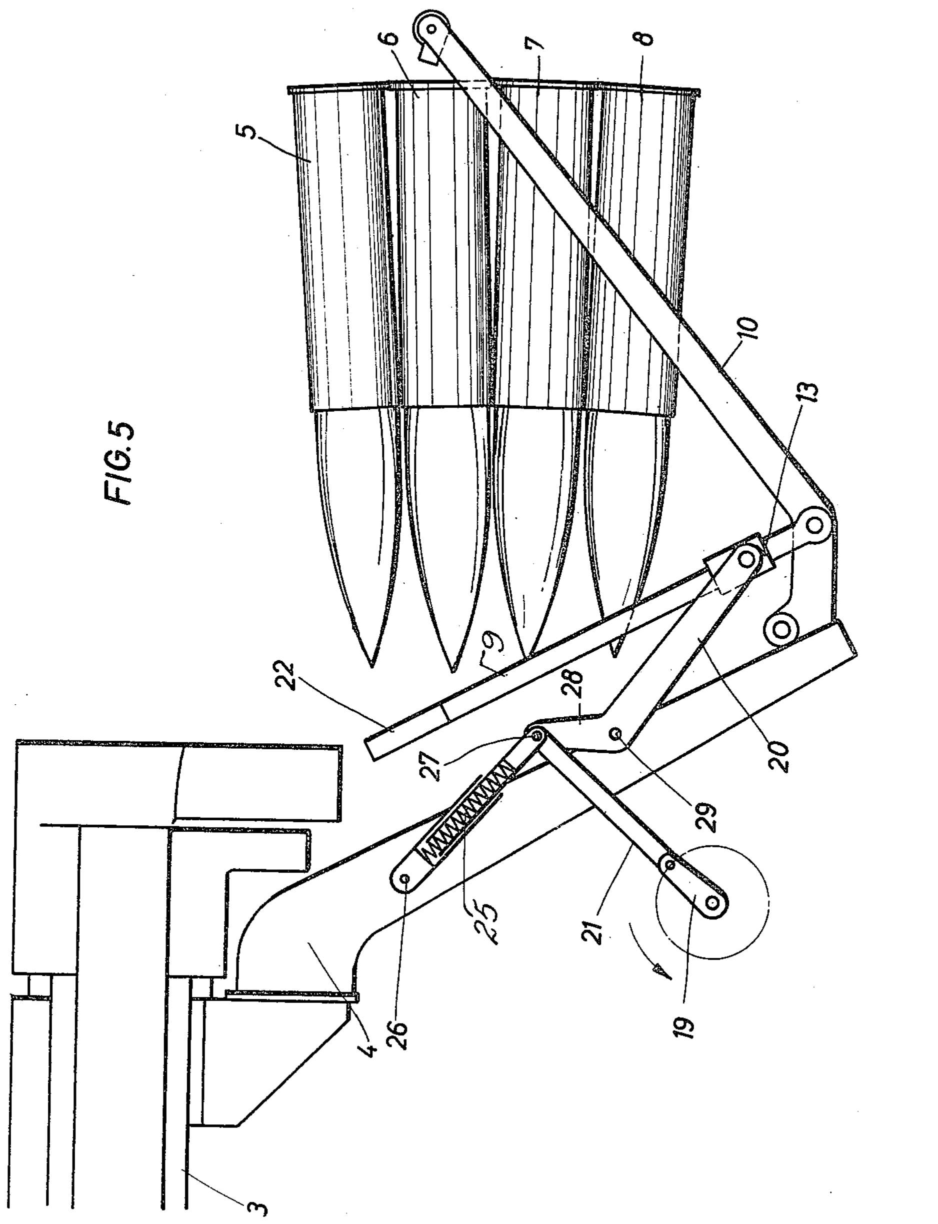
Figure 7:
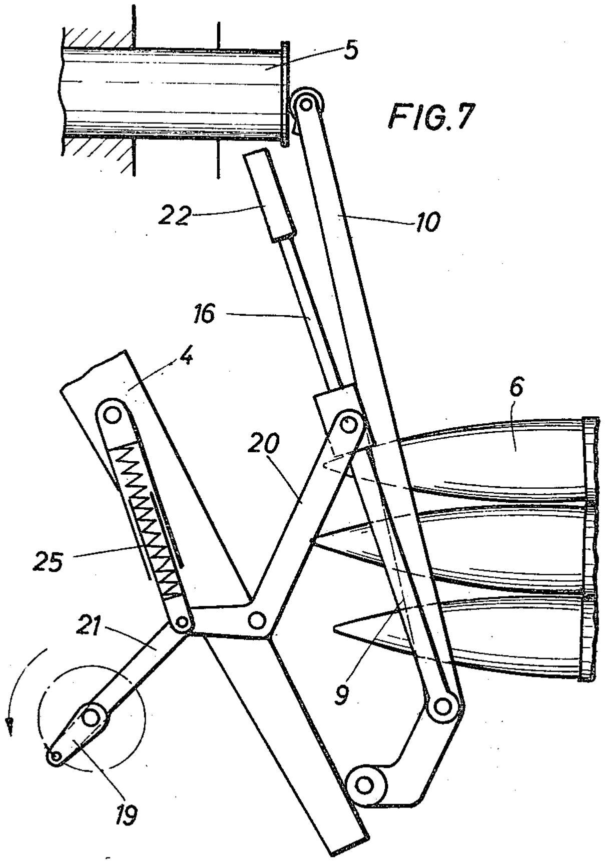
Figures 8, 9:
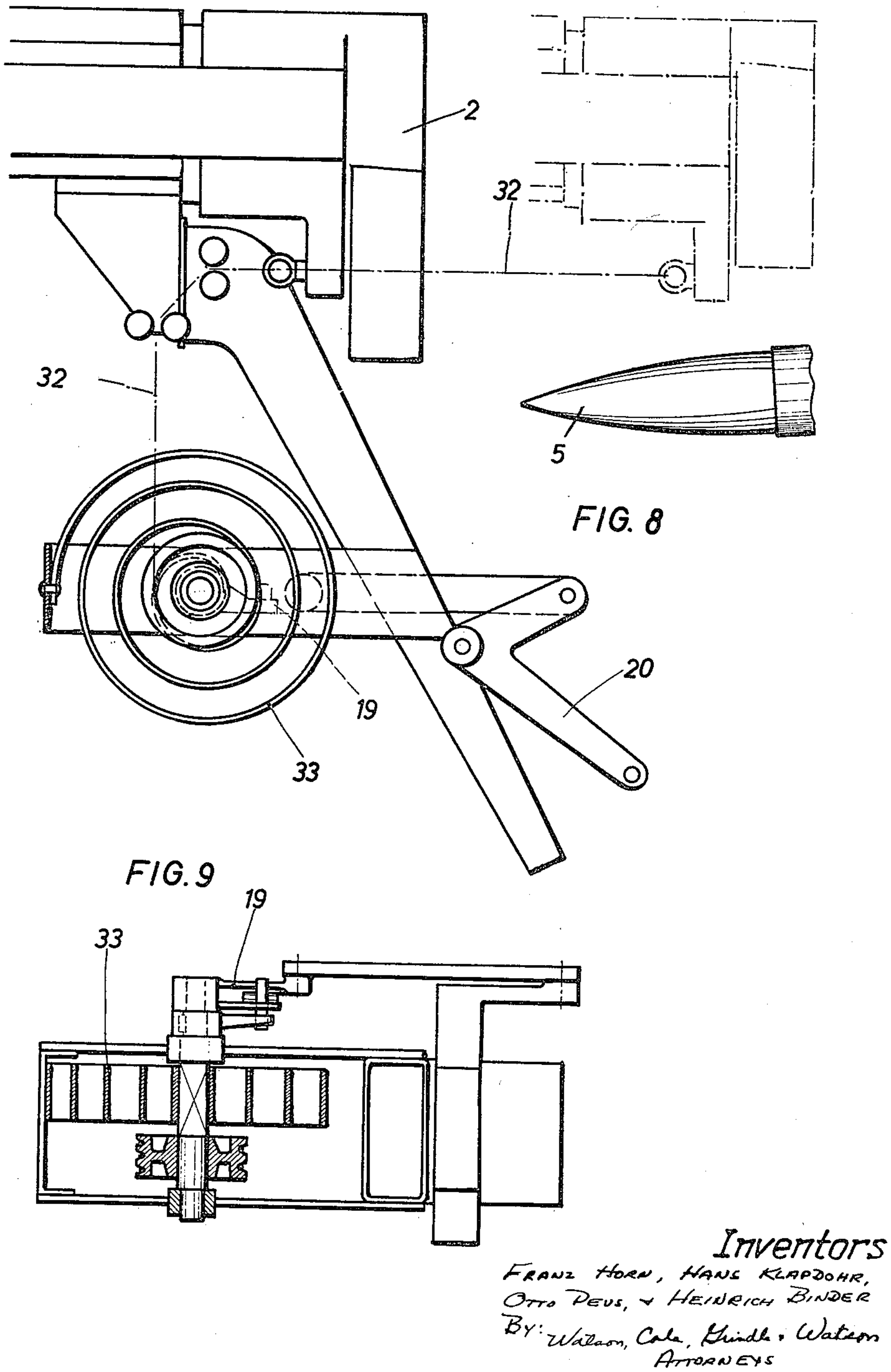
Figure 10:
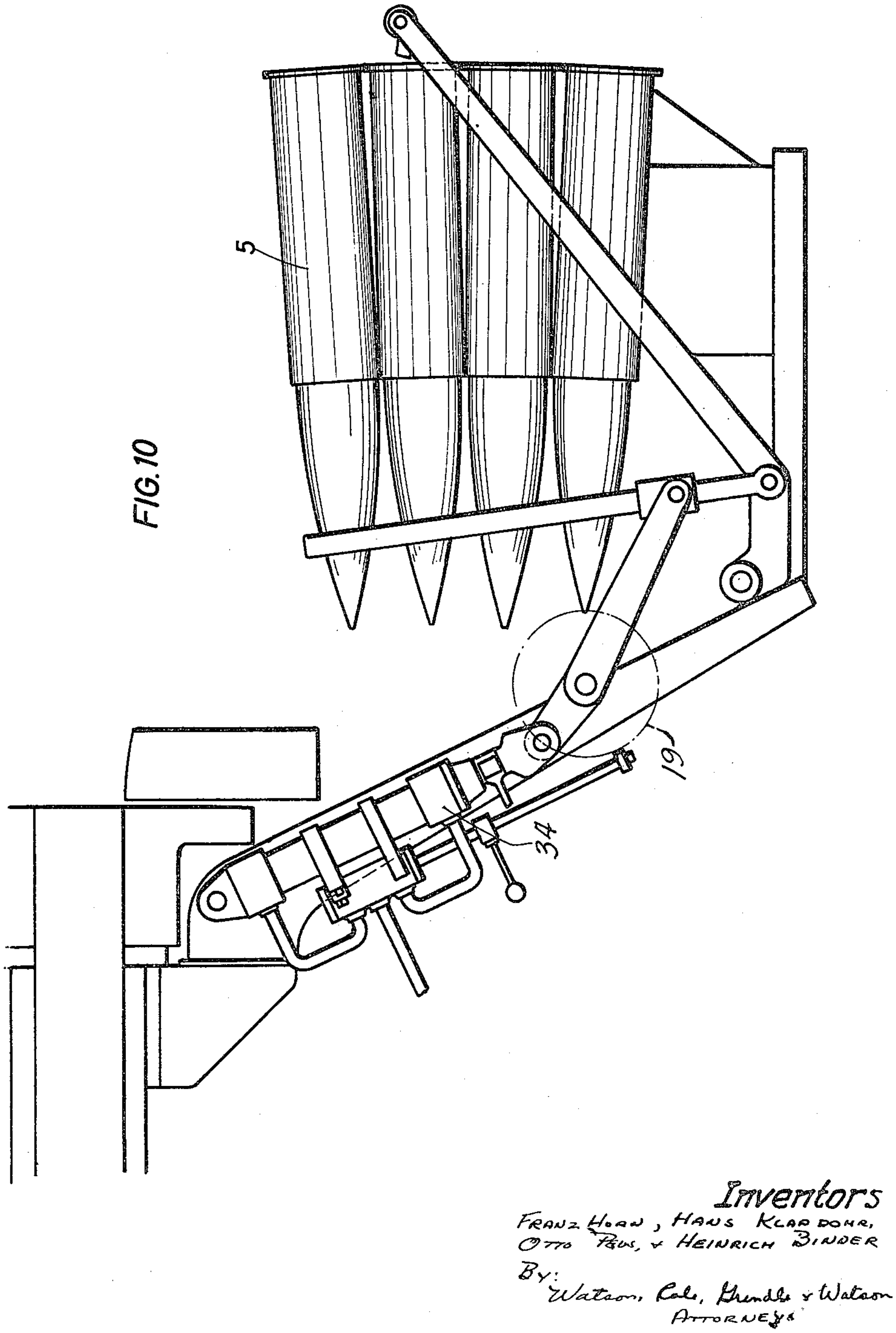
Figure 11:
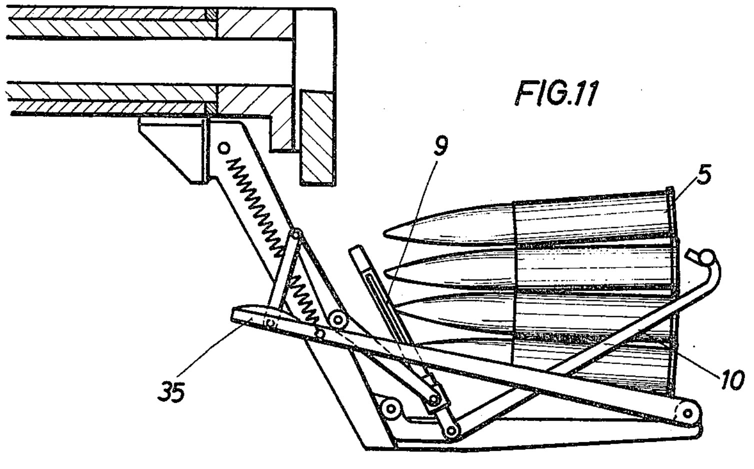
Figure 12:
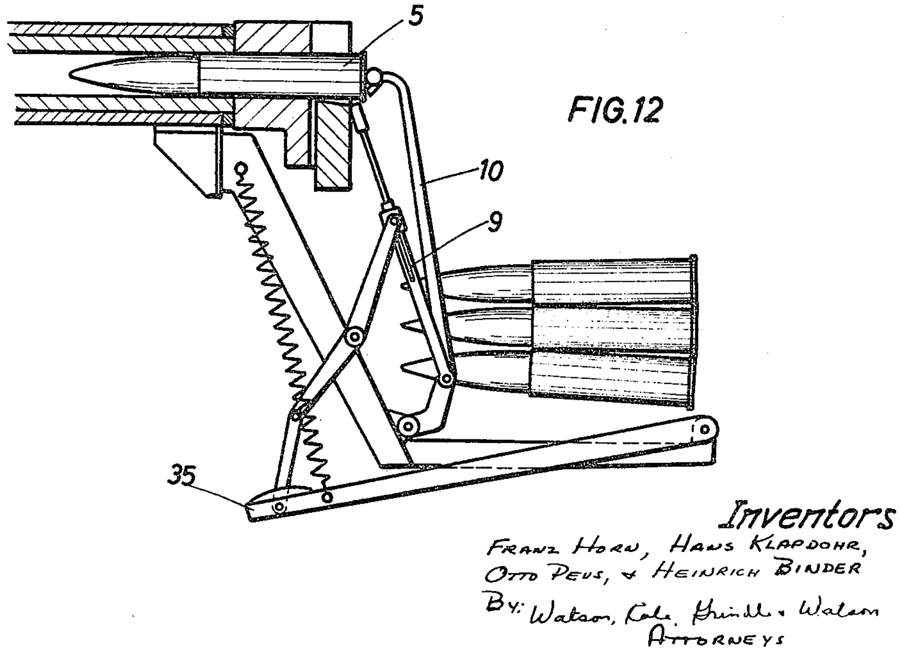
Figure 13:
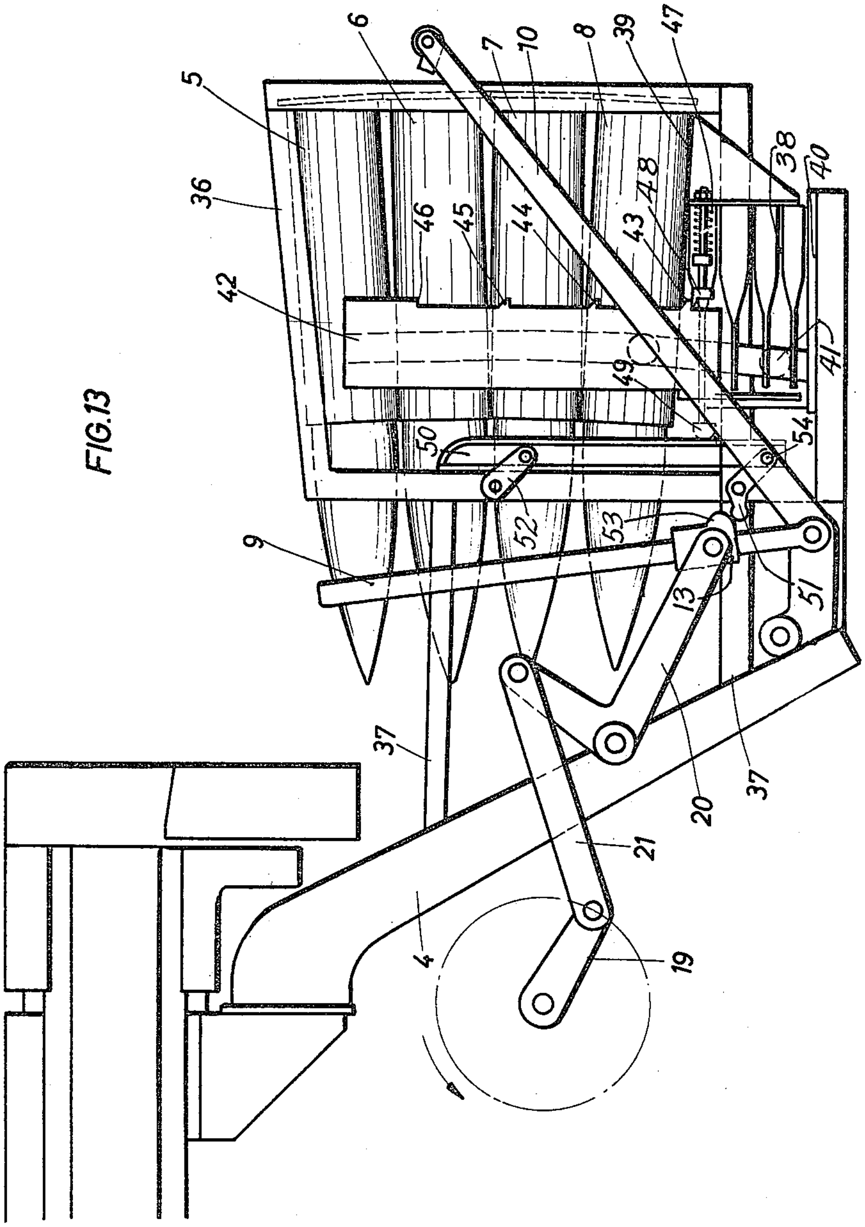
Figure 14:
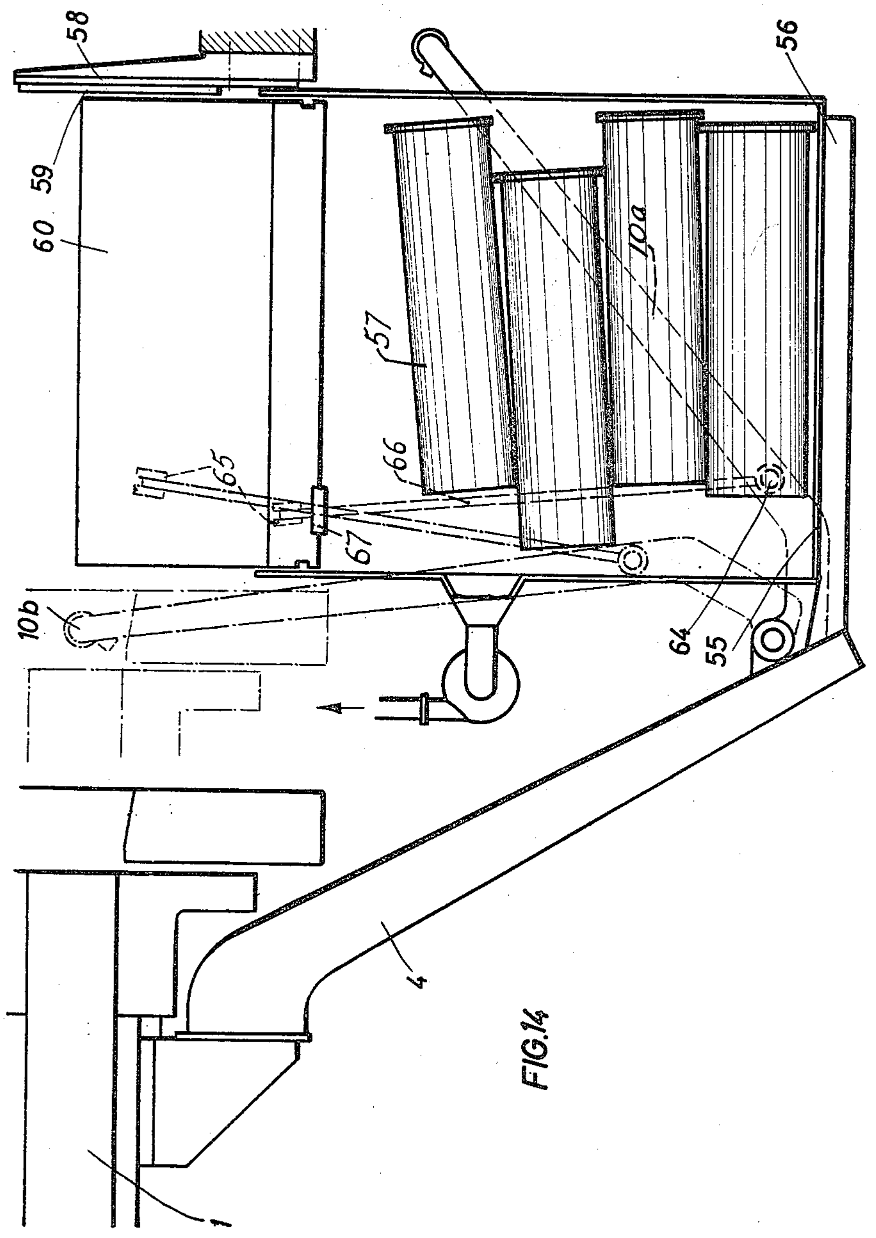
Figures 15, 16:
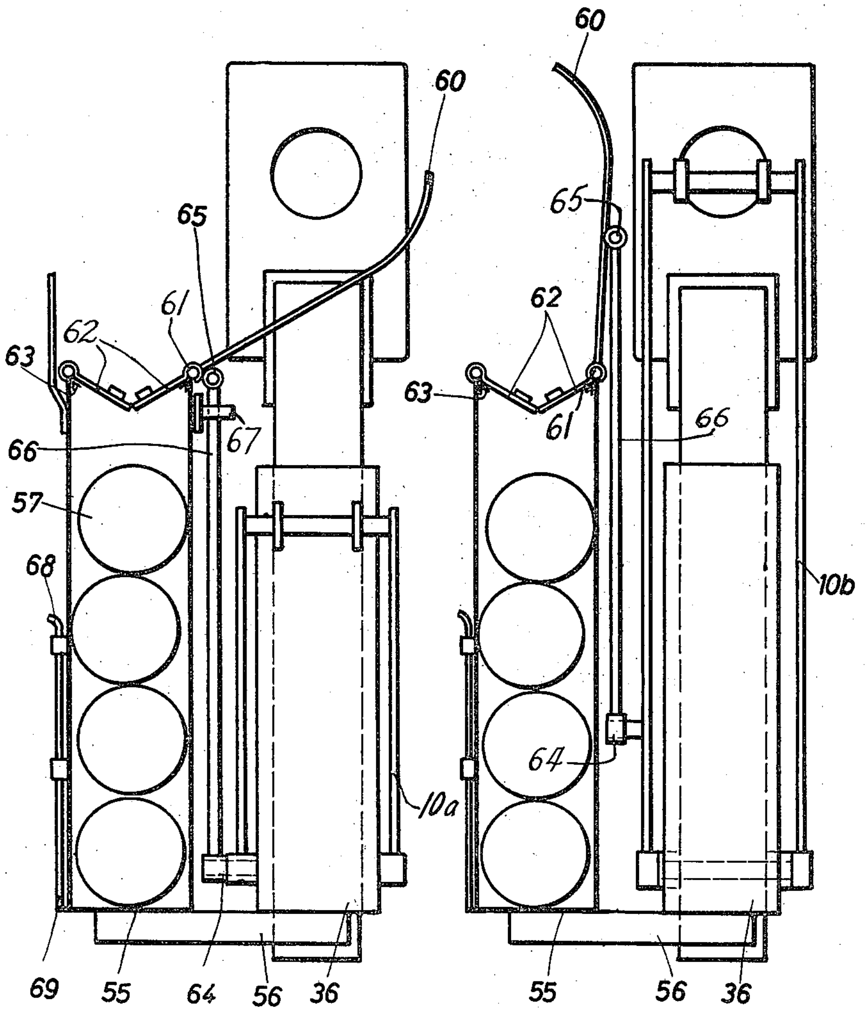

Further details and features of the invention will now be explained in greater detail by reference to a number of embodiments to illustrated in the accompanying drawing in which:

FIGS. 1 to 4 are side elevations partly in section showing four different positions of the loading operation carried out by a loading device constructed in accordance with the invention and attached to the end of the gun barrel, FIGS. 5 to 7 are side elevations of a device corresponding to FIGS. 1 to 4 and incorporating means to arrest the loading mechanism and to balance the actuating forces, FIG. 8 is a side elevation of a further modified structure of a loading mechanism operated by the recoil of the gun barrel, FIG. 9 is a plan view of the drive for the loading mechanism, partly in section, FIG. 10 is a side elevation showing a hydraulic drive for the loading mechanism, FIGS. 11 and 12 are side elevations of a pedal actuated loading mechanism showing two different positions, FIG. 13 is a side elevation of the apparatus showing further details of the shell rack, FIG. 14 is a side elevation of a loading mechanism, and FIGS. 15 and 16 are end views showing a cartridge box for use with the loading mechanism according to the invention to accommodate spent cartridge cases.

Referring to FIGS. 1 to 4, it will be seen that the rear end of the gun barrel 1 is provided with the breech block 2 and that in addition it is provided with an extension 4 attached to the gun cradle 3. To this extension the loading mechanism located behind the gun barrel is attached, so that the loading mechanism must necessarily follow all laying movements of the gun. The loading mechanism is located underneath the gun barrel at such a height that the loading mechanism will not obstruct the recoiling parts of the barrel 1 and the breech block 2.

According to the invention, the loading mechanism consists essentially of the shell rack with the shells 5, 6, 7 and 8 and the arms 9 and 10 which are provided at the sides and which can be extended or rotated in the vertical plane through the gun barrel. The shell rack is not shown in these figures for clarity purposes. The lifting arm 9 takes the form of an extensible telescopic tube, and the lifting or loading arm 10 is in the form of a lever which is supported at a fulcrum 11 on the extension 4 of the gun cradle and which is capable of rotation. Both these lifting arms are driven by a common actuator mechanism. To extend the telescopic tube 9, a sliding block 13 is provided which slides along the outer tube 12 (FIGS. 3 and 4). This sliding block 13 exerts an effect on the cross pin 15 of the inner tube 16 which travels along the longitudinal slots 14 in the outer tube. At the fulcrum 17 the lower end of the telescopic tube 9 is hinged to the loading lever 10 which pushes the shell into the breech, such that after the telescopic tube has reached its fully extended position, the sliding block 13 actuates also the loading lever 10 which pushes the shell into the breech. A crank 19, which rotates about the bearing 18 on the extension 4 of the gun cradle, is provided to actuate the loading mechanism. The motion of the crank is transmitted to the lifting arms 9 and 10 by means of a double-ended or ball-crane lever 20 which pivots about a fulcrum on the extension 4. One of the lever ends of this double ended lever 20 is hinged to the sliding block 13, and the other end is hinged to a connecting rod 21 which joins the double-ended lever and the crank 19. When the mechanism is actuated, the sliding block 13, which is joined to the double-ended lever 20, travels along the arc of a circle; hence the telescopic tube is not only extended longitudinally by the sliding block, but it is also reciprocated like a crank slot. The cross pins 15 of the extensible inner tube are so arranged that in the fully retracted position they are positioned at some distance from the contact surface of the sliding block 13. With this arrangement, the telescopic tube is turned automatically under the point of the next shell to be loaded before the tube is extended. When the shell is inserted into the barrel, the telescopic tube is returned and moved out of the way, thereby ensuring that the shell is correctly guided during the loading process.

The upper end of the inner telescopic tube 16 is furnished as shown in FIG. 3, with a guide fork 22 of a size appropriate to the diameter of the shell along which the shell can slide when it is being inserted into the breech. This guide fork is preferably furnished with slide rollers. In order to make it easier to telescope the tubes 12 and 16 together, a return spring 23 can, as shown in FIG. 3, be provided between the sliding block 13 and the guide fork 22 of the inner tube. The free end of the loading lever 10 is provided with a projection 24 which projects underneath the edge of the cartridge case of the shell 5 which is uppermost in the shell case during each loading operation. Viewed along the longitudinal centre line of the shell, this projection 24 is slightly displaced sideways, so that it can enter more easily between adjacent edges of cartridge cases. It is an advantage if the telescopic tube 9 and the loading lever 10 are provided in pairs, i.e. at either side of the shell rack, so that the loading mechanism can be stressed symmetrically and the loading arms can be made of light construction. The ends of these pairs of arms can be rigidly connected with each other, so that at the same time they will be prevented from bending upwards.

Figure 2:
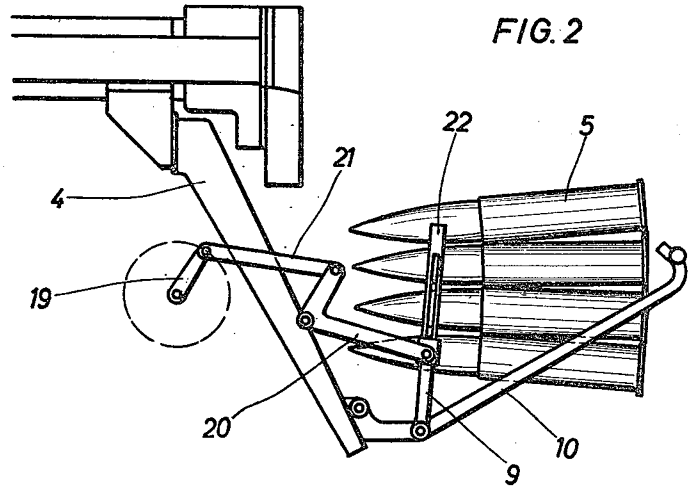

FIG. 1 shows the loading mechanism in the initial position. To load the gun, the crank 19 is rotated in the direction as indicated on the drawing. The movement of the crank is transmitted by the connecting rod 21 and the double-ended lever 20 to the sliding block 13 and this will first slide up freely on the outer tube 12 and cause the telescopic tube to be rotated in the vertical plane. During this movement, the guide fork 22 of the telescopic tube together with the slide rollers will, as is shown in FIG. 2, be moved underneath the front end of the shell 5 which is uppermost in the shell rack.

When the crank 19 is rotated further, the sliding block 13 comes in contact with the cross pin 15 of the extending inner tube 16 and pushes it upwards, so that the inner tube is being extended. This raises the front end of the shell 5 in the shell rack, so that the shell is pointed in the direction of the loading aperture of the gun barrel. FIG. 3 shows the telescopic tube in its fully extended position in which the cross pins 15 have reached the top end of the slots.

If the crank is rotated further so that the sliding block 13 continues to move upwards, the telescopic tube will move as a whole, including the outer tube 12, in an upward direction, so that the loading lever 10, which so far has remained at rest, will be rotated upwards pivoting about the fulcrum 17, FIG. 4. During this movement, the projections 24 at the end of the loading lever 10, which move along an arc of a circle, come in contact with the edge of the cartridge of the shell 5 and push the latter into the gun barrel 1 while at the same time the rear end of the shell is being lifted up. During this operation the guide fork 22 of the telescopic tube together with the slide rollers guides the movement of the sliding shell. The lever arm ratios are so selected that for a comparatively short travel of the telescopic tube, the loading lever 10 moves through a long arc. Thus the shell will be loaded at a high rate of speed which ensures that the shell will be located in the barrel in the required position. After the crank 19 has been rotated through 180° from the initial or dead centre position indicated in FIG. 1, the crank 19 reaches its second dead centre position, and, as will be seen from FIG. 4, the loading operation is completed. When the shell is being pushed into the barrel, the telescopic tube will also be rotated towards the loading aperture so, that after the shell has been pushed in, the free ends of the loading levers 9 and 10 will be in immediate contact with the rear end face of the gun barrel.

To return the loading levers 9 and 10 to the initial position according to FIG. 1, the crank 19 is rotated through another 180°, so that after the crank has been turned completely, the loading operation is completed and the loading arms have been returned to their initial position. The loading lever 10 is turned back to its initial position and the telescopic tube 9 is retracted either under gravity or by means of return springs, such as the spring 23. After the shell has been fired and the cartridge case has been ejected, the next shell can be loaded into the gun barrel merely by another rotation of the crank 19.

The mechanism of FIGS. 5 to 7 is employed to maintain the loading mechanism in the dead centre position and to balance the forces during the various stages of the operation. It consists essentially of a compression spring 25 preferably assembled in a state of compression of which one end is in contact with the pivot 26 of the extension 4 of the gun cradle while the other end is hinged to the pin 27 where the connecting rod 21 is linked to the double-ended lever 20. As will be seen from FIG. 5, the pivot 26 is so located that in the initial position of the loading mechanism the angle between the longitudinal centre line of the spring 25 and the arm 28 of the double-ended lever 20 is less than 180°, measured on the side facing the crank. Thus, the spring 25 will constantly apply a moment to the double-ended lever supported on the fulcrum 29 which opposes the moment necessary to actuate the loading mechanism. In this manner the sliding block 13, and with it also the loading arms 9 and 10, are always secured in the initial position without the use of special locking appliances. Any shocks which may be applied to the linkage mechanism will, with this arrangement, be absorbed elastically by the spring 25.

When the crank mechanism is actuated, it must first overcome the spring force of the spring 25, and at the same time it must raise the lifting arm 9 into the position as shown in FIG. 6. During this operation the spring is compressed still further due to the fact that an angle is included between the spring and the lever arm 28. Since only a small proportion of the actuating force is required in order to raise the lifting arm 9, it is an advantage of the storing of actuating force, which at the same time takes place in the spring 25, that the guide fork 22 is not pushed suddenly against the point of the shell; so that, particularly in the case of thin-walled shells, the point of the shell is protected against damage. After the lifting arm 9 has been raised up, the compression spring 25 has been rotated around the pivot 26 to such an extent that the spring is in the same straight line as the lever arm 28. As the crank 19 is rotated further, the spring 25 is allowed to expand so that during the following loading operation when the shell 5 is being lifted and inserted, the action will be supported and accelerated due to the energy previously stored in the spring. After the second dead centre position shown in FIG. 7 has been overcome, the actuating force works again against the compressing spring 25. Since the return of the loading arms 9 and 10 to their initial position only requires a small force, excess energy is again absorbed, preventing any jerkiness in the loading operation.

The crank 19 in the loading mechanism of the invention may be driven in a variety of ways. In the embodiments according to FIGS. 1 to 3, a manual drive is provided according to FIG. 4, an electric motor 30 provided with terminals is used which drives the crank 19 for example through a worm gear 31. If the mechanism is powered by an electric motor, preferably press button control is used which can be provided with a change-over device allowing the loading of single rounds or automatic loading of all the shells in the rack for continuous fire.

Another method of actuating the crank 19 is indicated in FIGS. 8 and 9. Here, the recoil of the gun barrel is employed to tension a spiral spring 33, which is connected with the crank 19, by means of a tension rope or cable 32. The energy so stored in the spiral spring is used to drive the loading mechanism. In order to ensure that the force stored in the spring, which drives the loading mechanism, is always of the same magnitude independent of the manner in which the barrel may recoil, an arrangement is provided so that any excess energy which may have been absorbed when the gun barrel recoils is again destroyed when the barrel moves forward again.

In the loading mechanism according to FIG. 10, a hydraulic drive is provided, which is in the form of a jack 34, for the actuation of the crank 19. Finally, FIGS. 11 and 12 show a loading mechanism with pedal actuation 35. Fig. 11 shows the loading mechanism in the initial position, while FIG. 12 shows the loading mechanism after the shell 5 has been inserted. Details of this mechanism will be obvious from the drawing.

FIG. 13 shows a shell rack 36 used in conjunction with the loading mechanism constructed in accordance with the invention. The rack 36 accommodates the shells 5 to 8 and is attached to the extension 4 of the gun cradle by means of the members 37. To carry the individual shells upwards into the position prior to loading (position of shell 5), the shell rack is provided with a spring 38 which acts upon the shell loading trough 39. This spring comprises a number of curved spring leaves lying one upon the other and rests upon the spring plate 40 which is also connected with the extension 4. The shell loading trough 39 is guided by guide rollers 41 in the guide rail 42. This guide rail is provided with a number of projections 43 to 46 located one above the other at the same distance as the shells. The shell rack spring 38 is secured in position by a bolt 48 acted upon by a spring 47 which is attached to the loading trough and which in the example as drawn is in contact with the lowest projection 43. The bolt 48 is connected by a release rod 49 with the release lever 50 which in turn is attached to the shell rack by means of the double-ended lever 51 and the lever 52 so that it is guided by a parallelogram motion. To actuate the lever 50, the slider block 13 is provided with a projection 53 which acts upon the projecting free arm of the double-ended lever 51.

After the topmost shell 5 has been inserted into the gun barrel—in the manner described with reference to FIGS. 1 to 4—and the crank 19 is continued to be rotated, the two lifting arms 9 and 10 will return again to their initial position. During this movement, the projection 53 of the sliding block 13 strikes the free arm of the lever 51, turning the latter through a certain angle, so that the release lever 50, which pivots about the fulcrum 54, is moved over its entire length parallel to the release bar 49. When the release bar is struck, the bolt 48 is pushed back, releasing in turn the loading trough 39 which, due to the force exerted thereon by the spring 38, is raised upwards, carrying the shells with it which rest upon it, until the bolt 48, which remains withdrawn only during the short time in which the projection 53 slides thereover, and comes in contact with the next projection 44. Now the shell 6 will be in the position prior to loading, and the next loading operation can commence. After the process has been repeated so often that the last shell in the rack has been inserted into the gun barrel, the loading trough will have reached its topmost position, and the rack can be refilled. To fill the rack, one shell after another is placed into the shell rack 36, overcoming the spring force of the spring 38.

A cartridge box which is particularly useful for use in conjunction with the loading mechanism according to the invention intended to accommodate the ejected spent cartridges, is shown in FIGS. 14 to 16. Details of the loading mechanism such as the drive etc. have been omitted for clarity, and essentially only the loading lever 10 in its two limiting positions, i.e. in the initial position 10*a* and the position 10*b* in which the lever inserts a shell into the breech. The cartridge box 55 is located by the side of the shell rack 36 and is mounted on a common base plate 56 which is attached to the extension 4 of the gun cradle.

After the gun has been fired, the gun barrel 1 recoils and the cartridge case 57, which has been ejected by an ejector, first strikes the rear wall 58 (FIG. 14) which is provided with a damper 59, e.g. a rubber, leather or hydraulic damper or like appliance and this stops the cartridge case and at the same time prevents it from rebounding. Next the cartridge case drops upon a guide plate 60 which pivots around the fulcrum 61 and which takes up the oblique position as shown in FIG. 15 when the cartridge case is ejected. Since the guide plate is an oblique position, the cartridge case rolls towards the closing flaps 62 of the cartridge box 55. The weight of the cartridge case depresses the hinged closing flaps 62 and the cartridge case enters the cartridge box. Since the closing flaps are acted upon by the springs 63, they then close again, thus preventing any propellant gases still inside the cartridge cases from escaping.

Since the guide plate 60, when occupying the position as shown in FIG. 15, is above the shell rack 36, it would be in the way during the loading operation as shown in FIGS. 1 to 4. For this reason a device is provided which automatically rotates the guide plate 60 upwards when the loading lever is rotated from its initial position 10*a* to its final position 10*b* according to FIG. 16. This device consists of a push rod 66 which is hinged to the pin 64 of the loading lever 10 and which is provided with the rollers 65; the free end of this push rod travels in guides 67 attached to the cartridge case. When the loading lever 10 is raised up, the rollers 65 of the push rod 66 travel upwards, urging the guide plate 60 to take up a substantially vertical position. The space above the shell rack is left free for the loading operation until the loading operation is completed and the loading lever returns to its initial position 10*a*, at the same time taking the push rod 66 with it. The guide plate 60 can then drop back to its original position as shown in FIG. 15 either under its own weight or with the aid of a spring. When the cartridge box is full, it is emptied through the opening 69 which can be closed by means of a flap 68. A separate exhaust mechanism may be provided for the propellant gases inside the cartridge box.

What we claim is:

1. Gun loading mechanism for use in armored gun mounts or gun turrets with a gun cradle and barrel comprising an extension member secured at one end to the gun cradle, a shell rack arranged below the rear end of the gun barrel to contain a series of stacked shells, a loading arm pivotally mounted on a fulcrum at the other end of the extension member, a bell-crank lever with pivotal mounting secured to the extension member and having two arms extending from the pivotal mounting, a lifting arm pivotally mounted on the loading arm and to which one of the arms of the bell-crank lever is connected, a connecting rod connected to the other arm of the bell-crank lever, and means connected to the connecting rod operable to actuate the bell-crank lever to first pivot the lifting arm relative to the loading arm to thereby lift the front bullet end of the shell and then the lifting arm will actuate the loading arm by pivotal movement around the fulcrum so that the loading arm will contact the end of the shell with both arms finally pivoting around the pivot for the loading arm to thus insert the shell into the barrel in a continuous and uninterrupted movement of the shell from its initial position into the barrel.

2. Gun loading mechanism according to claim 1, in which the lifting arm which lifts the front end of the shell comprises a telescopic tube, and in which the loading arm which pushes the shell into the barrel is in the form of a lever pivoting about its fulcrum.

3. Gun loading mechanism according to claim 1, in which the lifting arm which lifts the front end of the shell comprises a telescopic tube, and in which the loading arm which pushes the shell into the barrel is in the form of a lever pivoting about its fulcrum, the lower end of the telescopic tube being pivoted to the loading arm close to the fulcrum whereby after the telescopic tube has been extended a sliding block on the lifting arm effects the rotation of the said loading arm to push the shell into the barrel.

4. Gun loading mechanism according to claim 1, in which the means include a crank provided to actuate the two arms and in which a sliding block is provided on the lifting arm to transmit the movement of the crank to the sliding block.

5. Gun loading mechanism according to claim 1, in which the lifting arm which lifts the front end of the shell comprises a telescopic tube, and in which the loading arm which pushes the shell into the barrel is in the form of a lever pivoting about its fulcrum, and in which the free end of the loading arm is adapted to push the shell into the barrel and is provided with at least one projection in contact with an edge of the shell.

6. Gun loading mechanism according to claim 1, in which a compression spring is provided and is in a state of compression with one end of the spring thereof being attached to the connecting rod at a point where it is pivoted to the bell-crank lever to move the arms and the other end of the spring being pivoted to the extension member of the gun barrel.

7. Gun loading mechanism according to claim 1, in which a spring is provided which is connected to the connecting rod and operable on the recoil of the gun.

8. A gun loading mechanism to feed shells from a shell rack individually into the barrel of the gun, comprising a member connected to the gun and extending down under the gun, a feeding arm pivotally mounted at one end to the member and having means at the other end to contact the shells, an arm pivotally mounted on the feeding arm to contact and lift the front end of the shell during the loading operation, a two-armed lever pivotally mounted on the member and having one arm connected to the second mentioned arm, and means connected to the other arm of the lever to actuate both arms which follow pivoting movements with the ends which contact the shell to be loaded into the barrel following arcuate paths as the arms push the shell into the barrel.

9. A gun loading mechanism according to claim 8, in which the second-mentioned arm is extensible to lift the front end of the shells by the means and the lever during the loading of the shells.

10. A gun loading mechanism according to claim 8, in which the movable ends of the first and second-mentioned arms follow paths of different curvature during the loading of the shells.

11. A gun loading mechanism according to claim 8, in which a compression spring is connected to the member and the lever to balance the forces set up during the loading of the shells.

References Cited in the file of this patent

UNITED STATES PATENTS

| | | |
|---|---|---|
| 1,040,210 | Kastner | Oct. 1, 1912 |
| 1,304,583 | McClain | May 27, 1919 |
| 1,730,269 | Dorne | Oct. 1, 1929 |
| 2,781,696 | Shonts et al. | Feb. 19, 1957 |

FOREIGN PATENTS

| | | |
|---|---|---|
| 735,278 | Great Britain | Aug. 17, 1955 |
| 568,420 | Belgium | June 30, 1958 |